US012555731B2

(12) United States Patent
Ye et al.

(10) Patent No.: US 12,555,731 B2
(45) Date of Patent: Feb. 17, 2026

(54) BOX CORE MODULE, PLUG MODULE, AND SURGE PROTECTIVE DEVICE (SPD)

(71) Applicant: XIAMEN SET ELECTRONICS CO., LTD., Xiamen (CN)

(72) Inventors: Jian Ye, Xiamen (CN); Xianggui Zhang, Xiamen (CN)

(73) Assignee: XIAMEN SET ELECTRONICS CO., LTD., Xiamen (CN)

( * ) Notice: Subject to any disclaimer, the term of this patent is extended or adjusted under 35 U.S.C. 154(b) by 347 days.

(21) Appl. No.: 18/022,181

(22) PCT Filed: May 26, 2021

(86) PCT No.: PCT/CN2021/096106
§ 371 (c)(1),
(2) Date: Feb. 20, 2023

(87) PCT Pub. No.: WO2022/037163
PCT Pub. Date: Feb. 24, 2022

(65) Prior Publication Data

US 2023/0326697 A1 Oct. 12, 2023

(30) Foreign Application Priority Data

Aug. 19, 2020 (CN) ......................... 202021734877.0

(51) Int. Cl.
*H01H 71/02* (2006.01)
*H01H 71/04* (2006.01)
(Continued)

(52) U.S. Cl.
CPC ........ *H01H 71/0207* (2013.01); *H01H 71/04* (2013.01); *H01H 71/08* (2013.01);
(Continued)

(58) Field of Classification Search
CPC .... H01H 71/0207; H01H 71/04; H01H 71/08; H01H 71/12; H01H 83/10; H01H 73/08;
(Continued)

(56) References Cited

U.S. PATENT DOCUMENTS 4,654,619 A 3/1987 Citel
2011/0248816 A1* 10/2011 Duval .................... H01C 7/126
338/20
(Continued)

FOREIGN PATENT DOCUMENTS

CN 205829158 U 12/2016
CN 209313419 U 8/2019
(Continued)

*Primary Examiner* — Jacob R Crum
(74) *Attorney, Agent, or Firm* — Bayramoglu Law Offices LLC

(57) ABSTRACT

A box core module, a plug module, and a surge protective device (SPD) are provided. The plug module includes a housing, bottom plates, a plurality of box core modules with an independent tripping mechanism, a first pin electrode, and a second pin electrode. The plurality of box core modules are vertically arranged on a side of the bottom plates in a side-by-side or opposite manner, and the plurality of box core modules are connected by an internal connection electrode to form a series and/or parallel combined line. The combined line is led out through the first pin electrode and the second pin electrode. The plug module is combined with a base. A modularized multi-form assembly-type SPD is provided. Mutual conversion between a high working voltage of the SPD and a large lightning strike through-current is achieved when the same voltage-limiting element is used and an overall tripping mode remains unchanged.

15 Claims, 10 Drawing Sheets

(51) Int. Cl.

| | |
|---|---|
| ***H01H 71/08*** | (2006.01) |
| ***H01H 71/12*** | (2006.01) |
| ***H01H 83/10*** | (2006.01) |
| ***H02H 9/04*** | (2006.01) |

(52) U.S. Cl.
CPC ............ *H01H 71/12* (2013.01); *H01H 83/10* (2013.01); *H02H 9/04* (2013.01)

(58) Field of Classification Search
CPC .. H01H 2037/762; H01H 37/761; H02H 9/04; H01C 7/126
See application file for complete search history.

(56) References Cited

U.S. PATENT DOCUMENTS

| | | | | |
|---|---|---|---|---|
| 2016/0111871 | A1* | 4/2016 | Ruess ...................... | H01C 7/12 361/118 |
| 2018/0330908 | A1* | 11/2018 | Vrhunc .................. | H01H 85/04 |
| 2018/0374666 | A1 | 12/2018 | Shanghai et al. | |
| 2019/0295799 | A1* | 9/2019 | Wang ..................... | H01H 85/38 |
| 2021/0104372 | A1* | 4/2021 | Qiu ...................... | H01H 85/306 |

FOREIGN PATENT DOCUMENTS

| | | | |
|---|---|---|---|
| CN | 209658117 | U | 11/2019 |
| CN | 210490455 | U | 5/2020 |
| CN | 213071021 | U | 4/2021 |

* cited by examiner

BOX CORE MODULE, PLUG MODULE, AND SURGE PROTECTIVE DEVICE (SPD)

CROSS-REFERENCE TO THE RELATED APPLICATIONS

This application is the national phase entry of International Application No. PCT/CN2021/096106, filed on May 26, 2021, which is based upon and claims priority to Chinese Patent Application No. 202021734877.0, filed on Aug. 19, 2020, the entire contents of which are incorporated herein by reference.

TECHNICAL FIELD

The present disclosure relates to the field of low-voltage electrical equipment, and in particular, to a box core module, a plug module, and a surge protective device (SPD).

BACKGROUND

In a low-voltage distribution system, for overvoltage caused by lightning, an SPD is more commonly used by technicians in the industry to provide protection. As a core component of the SPD, a varistor is generally limited by the processing capacity of the varistor and the outline dimension of the SPD. When a working voltage of a protection system exceeds the working voltage of the varistor, a plurality of (≥2) varistors of the same type are usually used in series to ensure the normal use of the SPD at a high working voltage. When an impulse current of the protection system is greater than a through-current limit of the varistor, a plurality of (≥2) varistors of the same type are used in parallel to ensure that the SPD can withstand a large enough impulse current.

The prior SPD is generally designed separately based on a series connection state and a parallel connection state of varistors used; in other words, the manner of connecting the varistors in series or parallel directly affects the tripping mechanism of the SPD and even the structure of the whole SPD. This inevitably leads to low repeatability, low universality, a long development cycle, and a high cost of parts, which is contrary to diversified market demand.

SUMMARY

Given the above shortcomings in the prior art, the present disclosure is intended to provide a modularized multi-form assembly-type SPD. Through different combinations of series connections and parallel connections of all box core modules, mutual conversion between a high working voltage of the SPD and a large lightning strike through-current can be achieved when the same voltage-limiting element is used and an overall tripping mode remains unchanged.

To achieve the above objectives, the present disclosure provides a box core module, including a box core frame, a voltage-limiting element, a spring electrode, and a tripping mechanism. The voltage-limiting element and the spring electrode are respectively arranged on the front and back sides of the box core frame. The voltage-limiting element includes a pin electrode and a tripping electrode. The tripping electrode of the voltage-limiting element and one end of the spring electrode are welded using a fusible alloy. The tripping mechanism acts on the spring electrode. The tripping mechanism always separates the tripping electrode from the spring electrode when the fusible alloy is melted. The pin electrode of the voltage-limiting element is led out from a side surface of the box core frame to form a first module electrode of the box core module, and an electrode of the tripping mechanism is fixedly led out from the bottom surface of the box core frame to form a second module electrode of the box core module.

Further, the voltage-limiting element is a varistor or a transient suppression diode.

Further, the tripping mechanism includes the box core frame, a spring, and a slider. When the fusible alloy is melted, the spring pushes the slider to slide within the box core frame to always separate the tripping electrode from the spring electrode.

Further, an indication device is disposed on the box core module. A side of the box core frame on which the tripping mechanism is disposed is provided with a positioning column. The indication device is disposed on the positioning column, and the indication device rotates by a certain angle around an axis of the positioning column under a sliding effect of the slider.

Further, two side surfaces of the box core frame are provided with a snap device for positioning the pin electrode.

To achieve the above objectives, the present disclosure further provides a plug module, including a housing, a bottom plate, and a plurality of box core modules with an independent tripping mechanism. The plurality of box core modules are vertically arranged on the bottom plate in the same direction and side-by-side manner. The plurality of box core modules are connected by an internal connection electrode to form a parallel combined line, or the plurality of box core modules are vertically arranged on the bottom plate in an opposite direction and side-by-side manner, and every two adjacent box core modules are connected by an internal connection electrode to form a series combined line. The combined line is led out through a first pin electrode and a second pin electrode, and the box core module is the box core module described in any one of the above technical solutions.

Further, there are two box core modules; the two box core modules are vertically arranged on the bottom plate in the opposite direction and side-by-side manner. The connection electrode includes a series electrode arranged on the bottom surface of the bottom plate. The second module electrodes of the two box core modules are fixedly and conductively connected at the bottom side through the series electrode. The first pin electrode and the second pin electrode are led out from two sides of the bottom plate, respectively. The first module electrodes of the two box core modules are fixedly and conductively connected to the two pin electrodes, respectively, such that the two box core modules form the series combined line.

Further, the series electrode is a planarly-structured electrode.

Further, the plurality of box core modules are vertically arranged on the bottom plate in the same direction and side-by-side manner. The connection electrode includes a parallel electrode, second module electrodes of the plurality of box core modules are fixedly and conductively connected through the parallel electrode, and the parallel electrode is connected to the first pin electrode of the box core module. The first module electrodes of the plurality of box core modules are fixedly and conductively connected to the second pin electrode of the box core module, such that the plurality of box core modules form the parallel combined line.

Further, the parallel electrode is an electrode with an L-shaped structure. A vertically arranged end of the electrode with the L-shaped structure is fixedly and conductively connected to the first pin electrode of the box core module. A horizontally arranged end of the electrode with the L-shaped structure is separated to form two electrodes. The two electrodes are fixedly and conductively connected to the first module electrodes of the box core modules, respectively.

Further, the first pin electrode and the second pin electrode are plate-shaped electrodes of the same structure, and each includes a welding portion, a clamping portion, and a plugging portion. The plugging portion is led out from the bottom plate and is a lead-out pin of the plug module. The clamping portion is provided with a slot and/or a hole for clamping the box core module and the bottom plate. The welding portion is separated into welding electrodes having the same quantity as the box core modules, and the spacing between the centers of adjacent welding electrodes is the spacing between the centers of adjacent box core modules, such that the welding electrodes are fixedly and conductively connected to the first module electrodes of the box core modules.

To achieve the above objectives, the present disclosure provides an SPD, including a plug module and a base. The plug module is the plug module described in any one of the above technical solutions, and the base has a plug slot for accommodating the first pin electrode and the second pin electrode.

The present disclosure provides a modularized multi-form assembly-type SPD. Through different combinations of series connections and parallel connections of all box core modules, mutual conversion between a high working voltage of the SPD and a large lightning strike through-current can be achieved when the same voltage-limiting element is used and an overall tripping mode remains unchanged.

The above description is merely a summary of the technical solutions of the present disclosure. To make the technical means of the present disclosure more clear so it can be implemented in accordance with the content of the specification, and to make the above and other objectives, features, and advantages of the present disclosure more obvious and comprehensible, specific implementations of the present disclosure are described below.

BRIEF DESCRIPTION OF THE DRAWINGS

To describe the technical solutions in the embodiments of the present disclosure or the prior art more clearly, the following briefly describes the drawings of the embodiments or the prior art. Apparently, the drawings in the following description merely show some embodiments of the present disclosure, and those of ordinary skill in the art may still derive other drawings from these drawings without creative efforts.

DETAILED DESCRIPTION OF THE EMBODIMENTS

Figure 1:
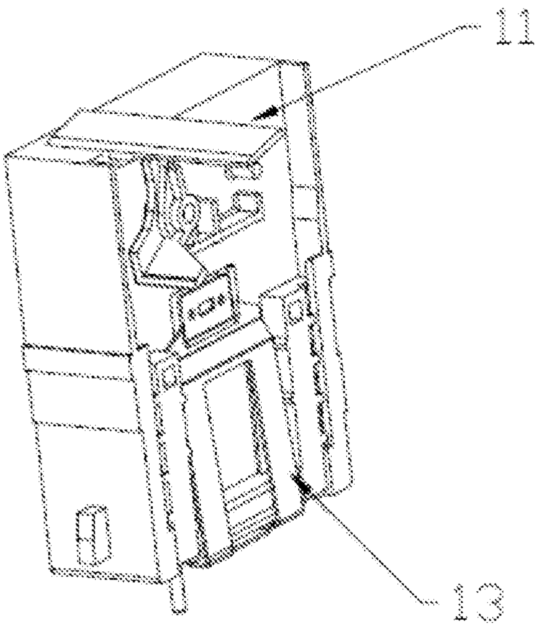
FIG. 1 is a schematic structural diagram of a box core module according to an embodiment of the present disclosure.

To further illustrate the embodiments, the present disclosure provides accompanying drawings. The accompanying drawings, as a part of the present disclosure, are mainly used to illustrate the embodiments and can explain the operating principles of the embodiments with reference to the related descriptions in this specification. With reference to such content, those of ordinary skill in the art can derive other possible implementations and advantages of the present disclosure. Components in the drawings are not drawn to scale, and similar reference numerals are usually used to represent similar components.

The present disclosure will be further described below with reference to the accompanying drawing and specific implementations.

Embodiment 1

Figure 2:
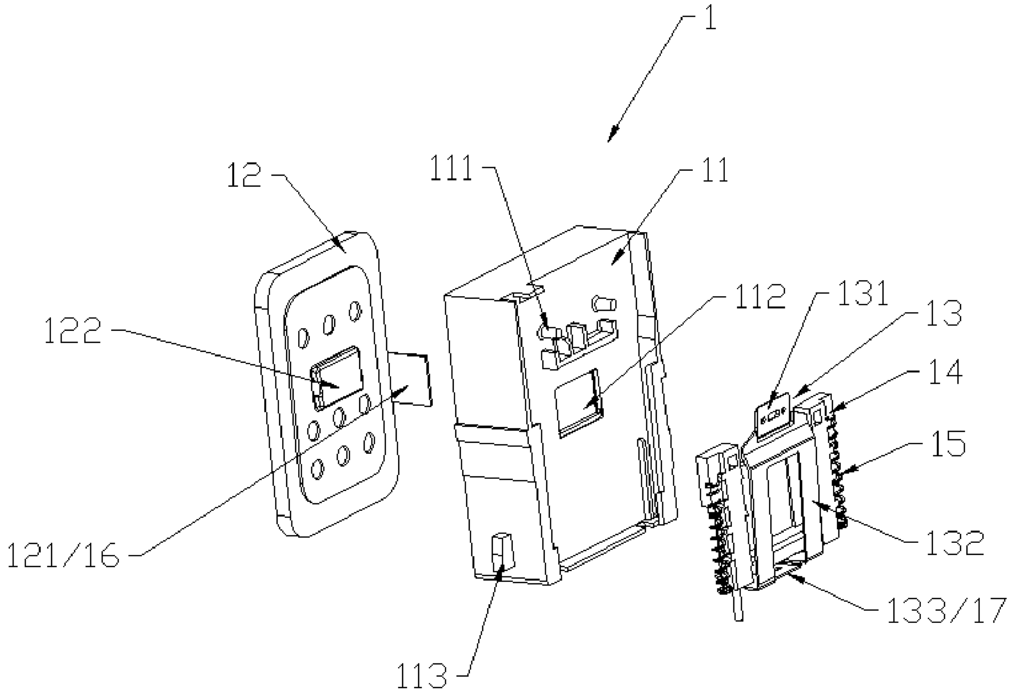
FIG. 2 is an exploded schematic diagram of the box core module in FIG. 1.
Figure 3:
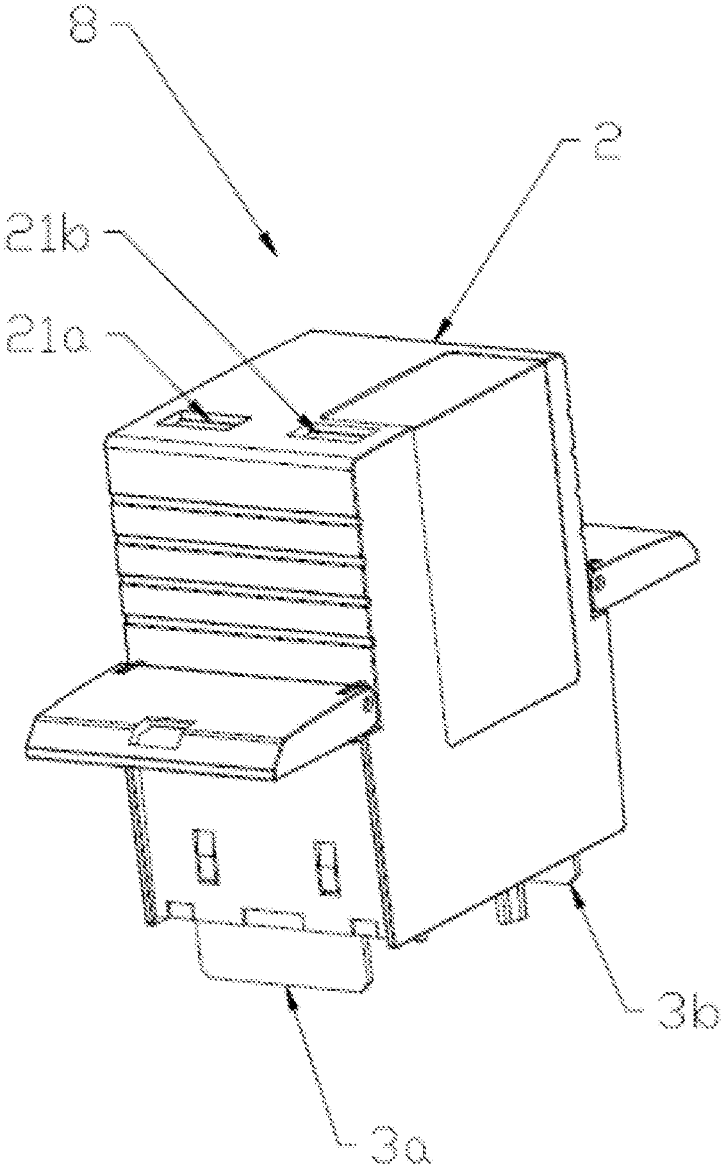
FIG. 3 is an external schematic diagram of a plug module according to an embodiment of the present disclosure.

As shown in FIG. 1 and FIG. 2, the present disclosure provides box core module 1 for a plug module of an SPD, including box core frame 11, varistor 12, spring electrode 13, slider 14, and spring 15.

In this embodiment, the varistor 12 is a voltage-limiting element. In practical application, based on an application need, the voltage-limiting element may alternatively be a transient voltage suppression diode to replace the varistor 12.

The varistor 12 and the spring electrode 13 are respectively arranged on the front and back sides of the box core frame 11. The slider 14 and the spring 15 form a tripping mechanism and are arranged on the same side of the box core frame 11 as the spring electrode 13.

The varistor 12 is provided with tripping electrode 122 and pin electrode 121, where the pin electrode 121 is fixed on a side of the box core frame 11 to form first module electrode 16 of the box core module. The spring electrode 13 includes welding portion 131, elastic connection portion 132, and lead-out portion 133. The tripping electrode 122 and the welding portion 131 of the tripping electrode 13 are welded using a fusible alloy, and the lead-out portion 133 is fixedly installed at a bottom of the box core frame 11 to form second module electrode 17 of the box core module 1. The elastic connection portion 132 of the spring electrode 13 limits the slider 14 and the spring 15 to a side of the box core frame 11, and the spring 15 is in an energy storage state to form the tripping mechanism. When the fusible alloy is melted, the slider 14 slides under the effect of the spring 15, and the tripping mechanism always separates the tripping electrode 122 from the welding portion 131 of the spring electrode 13.

In this embodiment, when the fusible alloy is melted, the spring 15 pushes the slider 14 to slide within the box core frame 11 to always separate the tripping electrode 122 from the spring electrode 13.

In this embodiment, an indication device is disposed on the box core module 1, a side of the box core frame 11 on which the tripping mechanism is disposed is provided with positioning column 111. The indication device is disposed on the positioning column, and the indication device rotates by a certain angle around an axis of the positioning column under the sliding effect of the slider. For details, reference is made to the following description of a plug module.

In this embodiment, two sides of the box core frame 11 are provided with snap device 113 for positioning the pin electrode. For details, reference is made to Embodiment 2 and Embodiment 3.

As shown in FIG. 3 to FIG. 13, this embodiment of the present disclosure provides two forms of plug module 8 for the SPD. The plug module 8 includes housing 2, a bottom plate, a plurality of box core modules with an independent tripping mechanism, and two pin electrodes 3*a* and 3*b*. The plurality of box core modules are vertically arranged on a side of the bottom plate (not shown) in the same direction and side-by-side manner or the opposite direction and side-by-side manner and are connected by the pin electrodes 3*a* and 3*b* and an internal connection electrode to form a series and/or parallel combined line, and the combined line is led out through the pin electrodes.

Figure 4:
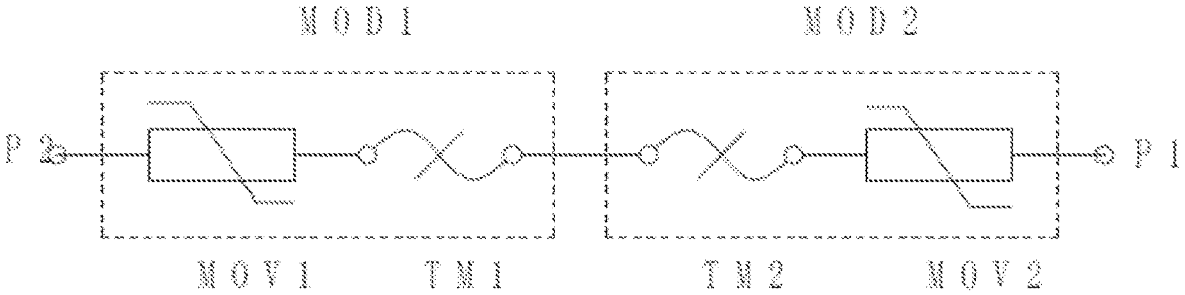
FIG. 4 is a schematic circuit diagram of a plug module in a first form (two box core modules are connected in series) according to an embodiment of the present disclosure.
Figure 5:
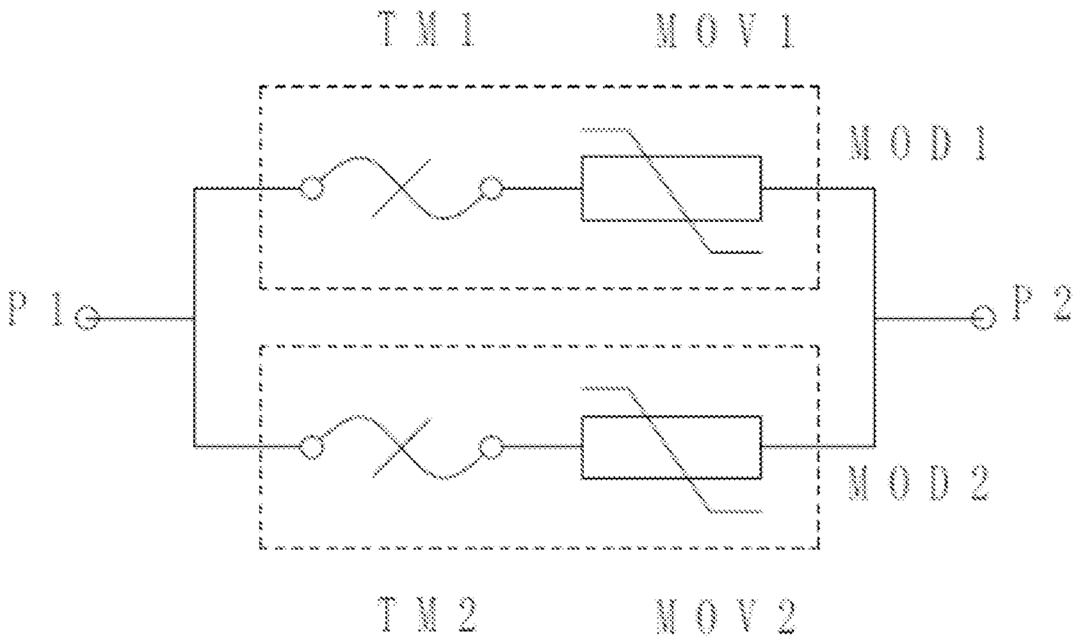
FIG. 5 is a schematic circuit diagram of a plug module in a second form (two box core modules are connected in parallel) according to an embodiment of the present disclosure.
Figure 6:
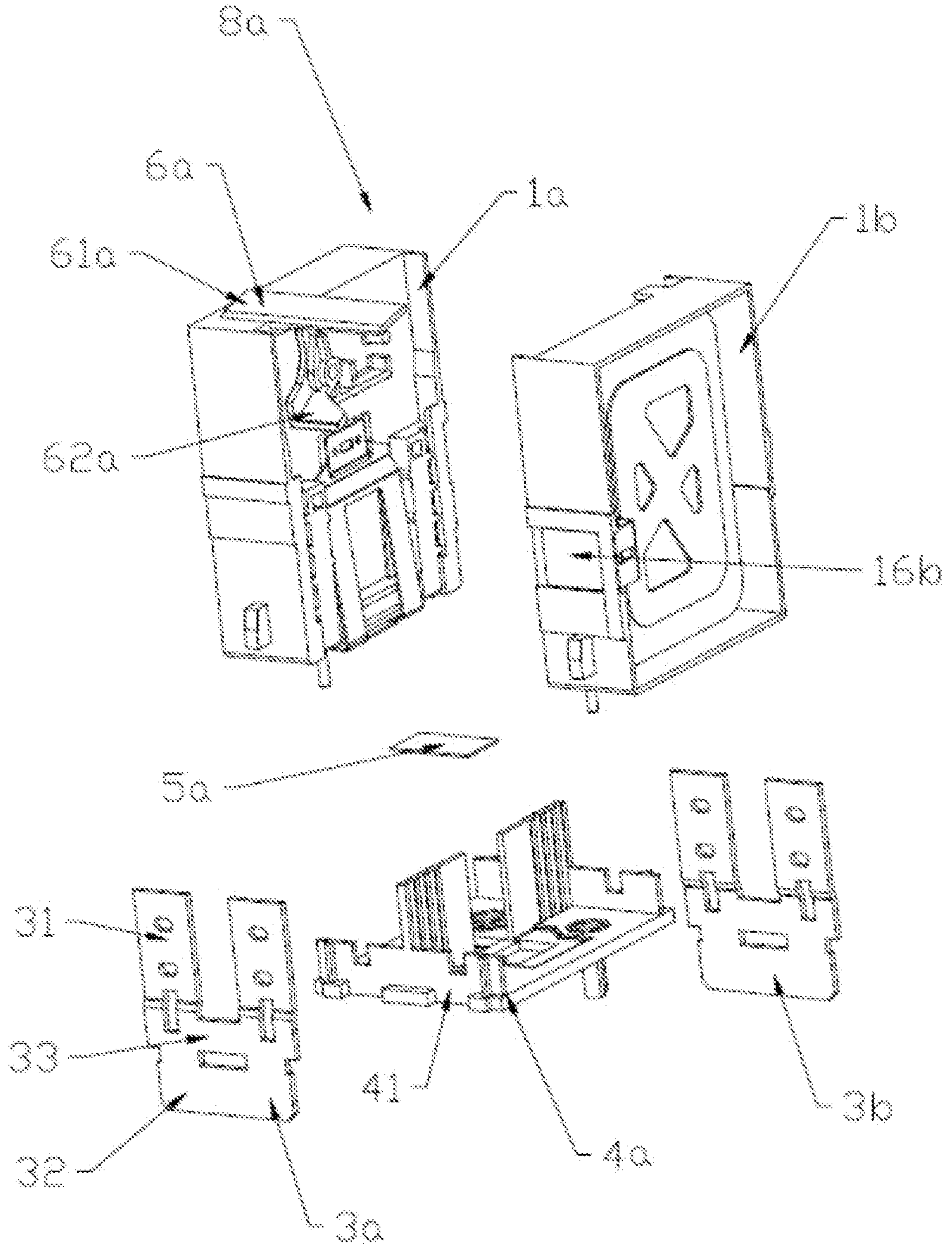
FIG. 6 is an exploded schematic diagram of an internal structure of a plug module in a first form (two box core modules are connected in series) according to an embodiment of the present disclosure.
Figure 7:
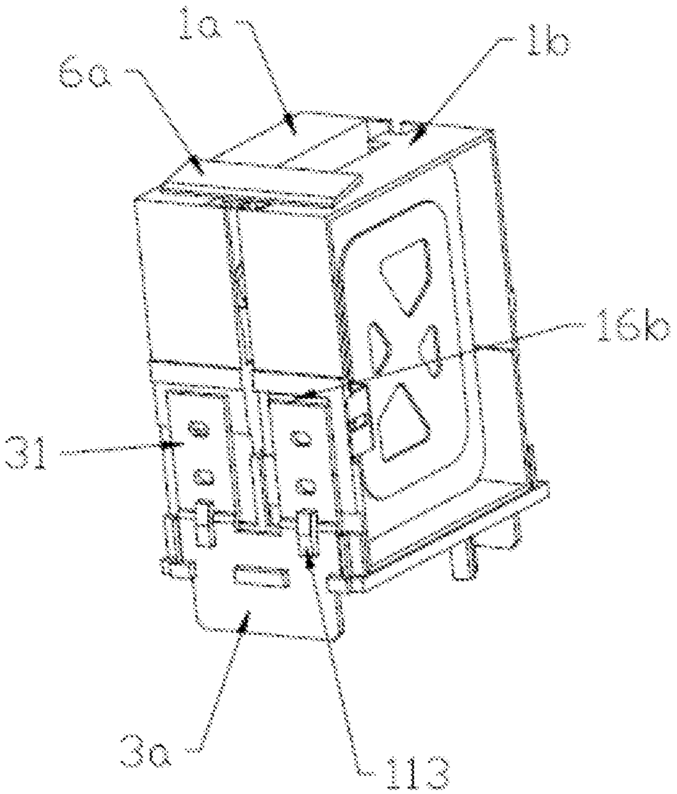
FIG. 7 is a schematic diagram of welding a left pin inside a plug module in a first form (two box core modules are connected in series) according to an embodiment of the present disclosure.
Figure 8:
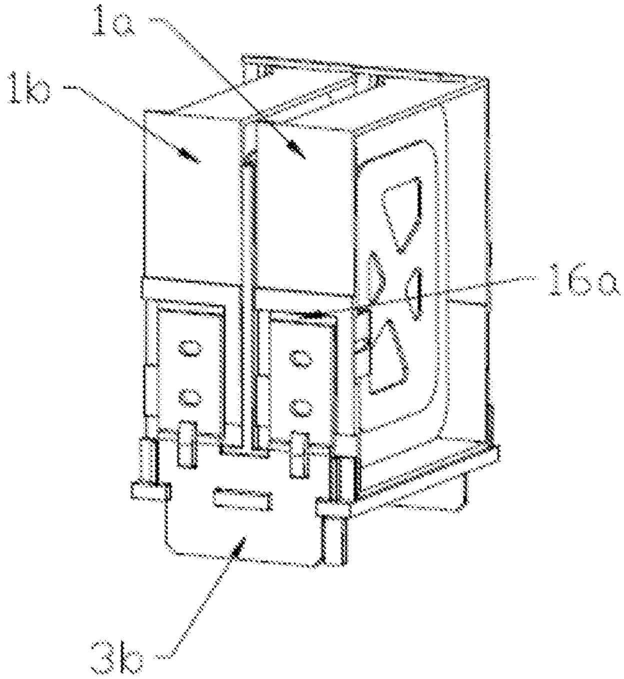
FIG. 8 is a schematic diagram of welding a right pin inside a plug module in a first form (two box core modules are connected in series) according to an embodiment of the present disclosure.
Figure 9:
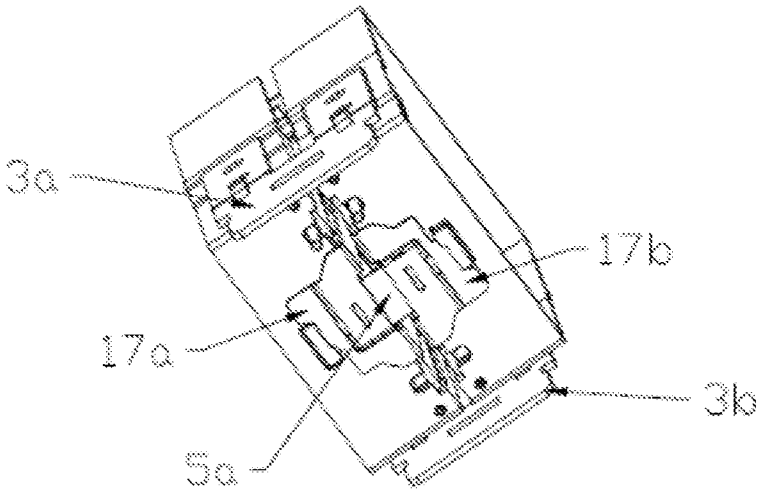
FIG. 9 is a schematic diagram of welding an internal connection member of a plug module in a first form (two box core modules are connected in series) according to an embodiment of the present disclosure.
Figure 10:
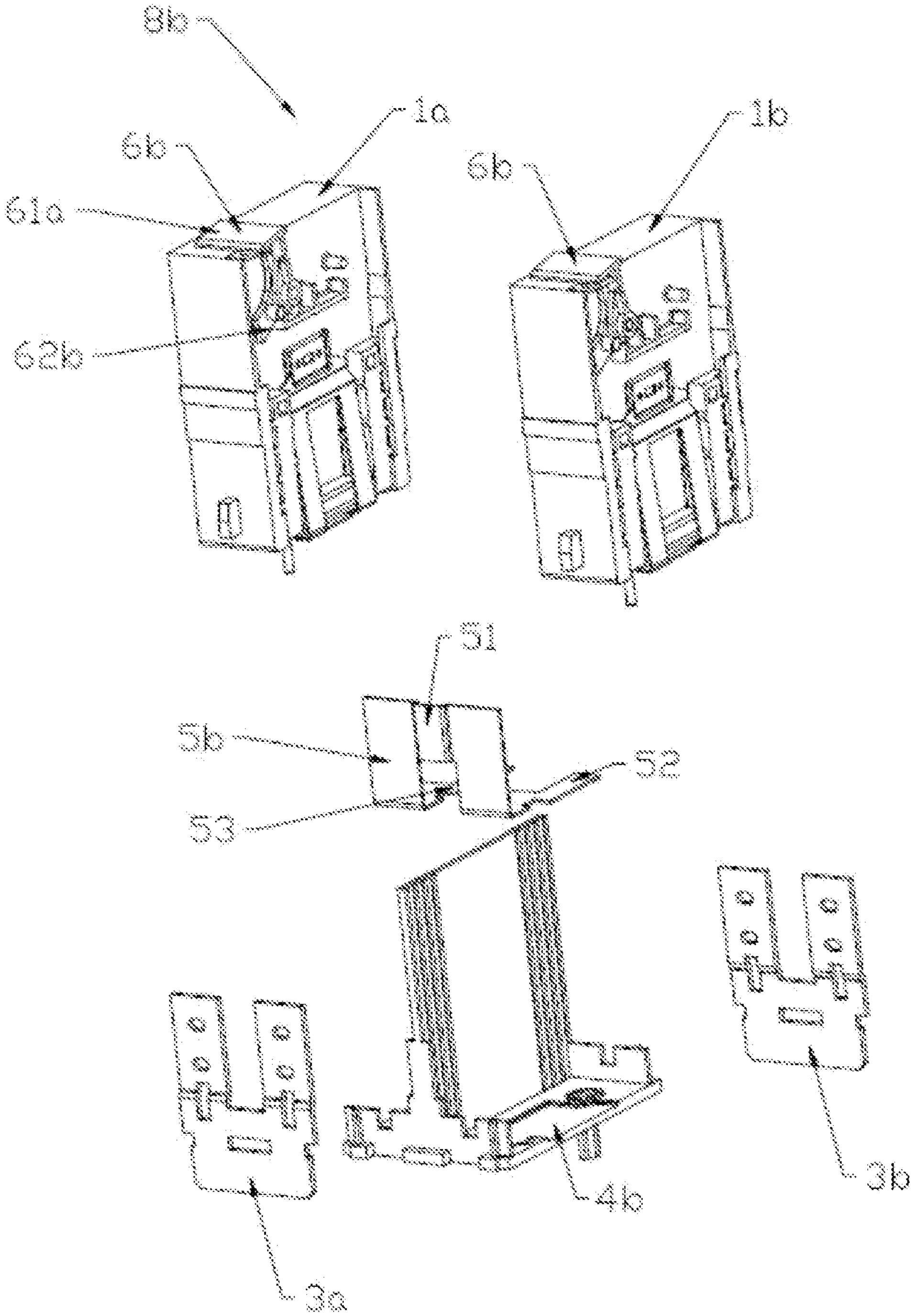
FIG. 10 is an exploded schematic diagram of an internal structure of a plug module in a second form (two box core modules are connected in parallel) according to an embodiment of the present disclosure.
Figure 11:
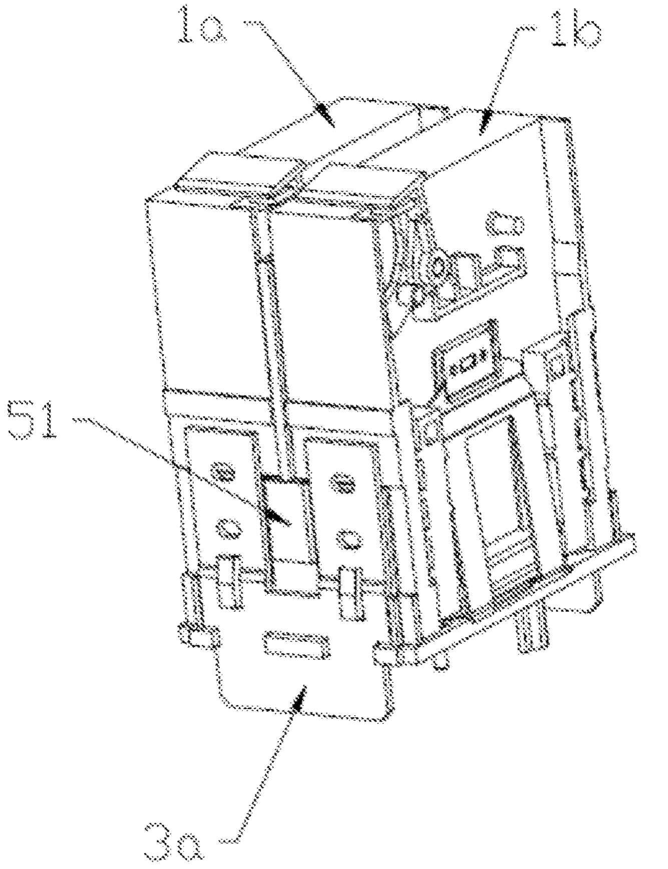
FIG. 11 is a schematic diagram of welding a left pin inside a plug module in a second form (two box core modules are connected in parallel) according to an embodiment of the present disclosure.
Figure 12:
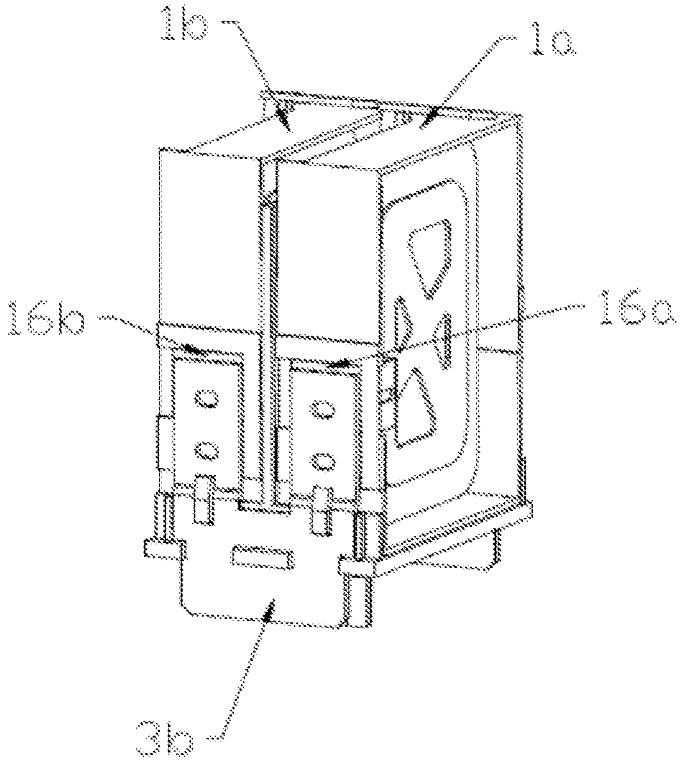
FIG. 12 is a schematic diagram of welding a right pin inside a plug module in a second form (two box core modules are connected in parallel) according to an embodiment of the present disclosure.
Figure 13:
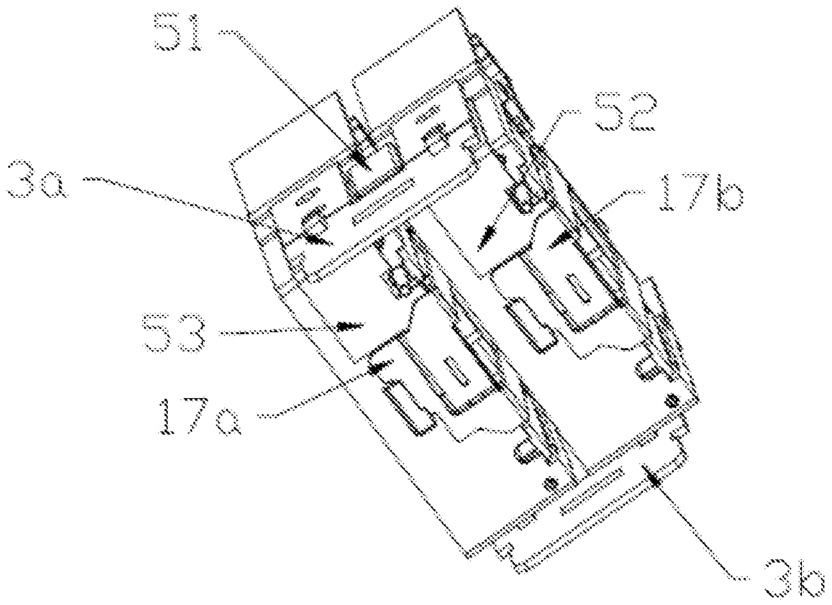
FIG. 13 is a schematic diagram of welding an internal connection member of a plug module in a second form (two box core modules are connected in parallel) according to an embodiment of the present disclosure.

FIG. 4 and FIG. 5 show schematic circuit diagrams of the two forms of the plug module 8 of the SPD. In the figures, MOD1 and MOD2 represent box core modules, MOV1 and MOV2 represent varistors, TM1 and TM2 represent tripping mechanisms, and P1 and P2 represent pin electrodes of the plug module. FIG. 4 shows a first form of the plug module. The two box core modules form a series combined line in a manner of P2-MOV1-TM1-TM2-MOV2-P1. The series combined line can be further expanded. If four box core modules are applied, a series combined line in a manner of P2-MOV1-TM1-TM2-MOV2-MOV3-TM3-TM4-MOV4-P1 is formed. FIG. 5 shows a second form of the plug module. The two box core modules form a parallel combined line. The parallel combined line can be further expanded, and three or more box core modules are supported.

Embodiment 2

As shown in FIG. 6 to FIG. 9, this embodiment of the present disclosure provides a structural diagram of a plug module in first form 8*a* containing two box core modules 1*a* and 1*b*. The box core modules 1*a* and 1*b* are vertically arranged on series bottom plate 4*a* in an opposite direction and side-by-side manner. An internal connection electrode is series electrode 5*a*, and the series electrode 5*a* is a a planarly-structured electrode electrode (the a planarly-structured electrode electrode may be flat or may be arranged as a plane through a flexible flat cable). Second module electrodes 17*a* and 17*b* of the box core modules 1*a* and 1*b* are fixedly and conductively connected through the series electrode 5*a*, and first module electrodes 16*a* and 16*b* of the box core modules 1*a* and 1*b* are fixedly and conductively connected to pin electrodes 3*a* and 3*b* respectively, such that the two box core modules form a series combined line.

The two box core modules 1*a* and 1*b* correspond to MOD1 and MOD2 in FIG. 4, and the pin electrodes 3*a* and 3*b* correspond to P1 and P2 in FIG. 4.

In the present disclosure, the fixed and conductive connection may be achieved by welding or crimping, such that the two metal electrodes are fixed and fit to form the fixed and conductive connection.

In this embodiment, an indication device is integrated. The indication device 6*a* is arranged on the box core module 1*a*, and the indication device 6*a* includes indicator 61*a* and tripping touch portion 62*a*. When any one of the box core modules 1*a* and 1*b* is tripped, a slider moves upward and touches the tripping touch portion 62*a* and pushes the indication device 6*a* to rotate by a certain angle to place the indicator 61*a* under indication windows 21*a* and 21*b* of housing 2. The indicator 61*a* is provided with a color different from that of the box core frame 11 to give a tripping indication.

In Embodiment 1 and Embodiment 2, the series bottom plate 4*a* and parallel bottom plate 4*b* may be bottom plates of the same structure, or may be bottom plates of different structures as shown in the specific embodiment to provide a better assembly fit.

In this embodiment, the pin electrode 3*a* and the pin electrode 3*b* are electrodes of the same structure, and each includes welding portion 31, clamping portion 32, and plugging portion 33. The clamping portion 32 is provided with a slot and a hole for clamping snap device 113 of the box core module and snap device 41 on a sidewall of the bottom plate (including the series bottom plate 4*a* and the parallel bottom plate 4*b*) to connect the box core module 1*a*, the box core module 1*b*, the bottom plate, the pin electrode 3*a*, and the pin electrode 3*b* to form a whole. The welding portion 31 is separated into two welding electrodes, and the spacing between the centers of the welding electrodes is consistent with that between centers of the box core modules 1*a* and 1*b*. The welding portion 31 is welded with the first module electrode of the box core module 1 to realize a fixed and conductive connection. The plugging portion 33 is a lead-out pin of the plug module.

Embodiment 3

As shown in FIG. 10 to FIG. 13, this embodiment of the present disclosure provides a structural diagram of a plug module in second form 8*b* containing two box core modules 1*a* and 1*b*. The box core modules 1*a* and 1*b* are vertically arranged on parallel bottom plate 4*b* in the same direction and side-by-side manner. An internal connection electrode includes parallel electrode 5*b*. Second module electrodes 17*a* and 17*b* of the box core modules 1*a* and 1*b* are fixedly and conductively connected through the parallel electrode 5*b*, and the parallel electrode 5*b* is connected to pin electrode 3*a*. First module electrodes 16*a* and 16*b* of the box core modules 1*a* and 1*b* each are connected to pin electrode 3*b*, such that the box core modules 1*a* and 1*b* form a parallel combined line.

The core modules 1*a* and 1*b* correspond to MOD1 and MOD2 in FIG. 5, and the pin electrodes 3*a* and 3*b* correspond to P1 and P2 in FIG. 5.

The parallel electrode 5*b* is an electrode with an L-shaped structure, and vertically arranged end 51 of the electrode with the L-shaped structure is fixedly and conductively connected to the pin electrode 3*a*, a horizontally arranged end of the electrode with the L-shaped structure is separated to form electrodes 52 and 53, and the electrodes 52 and 53 are fixedly and conductively connected to the first module electrodes 16*a* and 16*b* of the box core modules 1*a* and 1*b*, respectively.

In this embodiment, the pin electrode 3*a* and the pin electrode 3*b* are electrodes of the same structure and are the same as the pin electrode in Embodiment 2.

For a plug module with a parallel line formed by a plurality of box core modules (there are more than two box core modules), welding portion 31 is separated into a plurality of welding electrodes, and the spacing between centers of adjacent welding electrodes is the spacing between centers of adjacent box core modules to weld each welding electrode and a first module electrode of box core module 1 to realize a fixed and conductive connection.

In this embodiment, a different indication device is disposed on each box core module. Two indication devices 6*b* are respectively arranged on the box core modules 1*a* and 1*b*, and the indication device 6*b* includes indicator 61*b* and tripping touch portion 62*b*. When any one of the box core modules 1*a* and 1*b* is tripped, a slider moves upward and touches the tripping touch portion 62*b* of the corresponding indication device 6*b* and pushes the indication device 6*b* to rotate by a certain angle to place the indicator 61*b* under indication window 21*a* or 21*b* of housing 2. The indicator 61*b* is provided with a color different from that of box core frame 11 to give a tripping indication.

Those skilled in the art can dispose a plurality of box core modules 1 side by side in accordance with an internal connection mode shown in Embodiment 2 and with reference to FIG. 4, and every two box core modules are connected through series electrode 5*a* and series electrode 5*c* in turn to form a series combined line. The series combined line is led out through the pin electrodes 3*a* and 3*b*. In accordance with an internal connection mode shown in Embodiment 3 and with reference to FIG. 5, those skilled in the art can dispose a plurality of box core modules 1 in the same direction and side-by-side manner and bifurcated electrodes having the same quantity as the box core modules on a parallel electrode with the L-shaped structure, such as 52 and 53 on the parallel electrode 5*b*, to lead out second module electrodes of the plurality of box core modules 1 in parallel. In addition, the widths of the pin electrodes 3*a* and 3*b* of the plug module are designed based on the quantity of box core modules 1 to lead out the first module electrodes of the plurality of box core modules 1 in parallel and the second module electrodes of the plurality of box core modules 1 in parallel.

Embodiment 4

Figure 14:
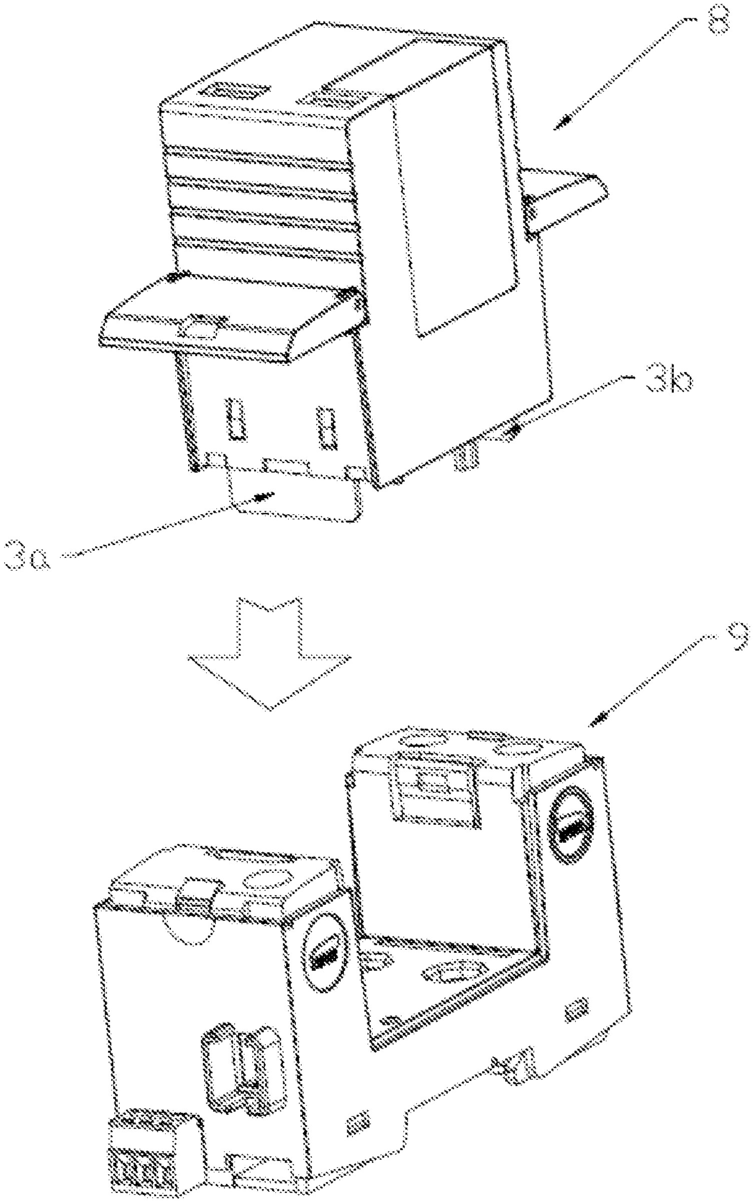
FIG. 14 is a schematic diagram of an SPD according to an embodiment of the present disclosure.

As shown in FIG. 14, this embodiment provides an SPD, including plug module 8 and base 9. Structural parameters of the plug module 8 and the base 9 comply with the specifications of a corresponding SPD, and the specifications are well known to those skilled in the art. Therefore, the structures of the plug module 8 and the base 9 are not further described herein.

The phrases "one embodiment", "embodiment" or "one or more embodiments" mentioned herein mean that a specific feature, structure, or characteristic described in combination with the embodiment is included in at least one embodiment of the present disclosure. In addition, it should be noted that the phrase "in an embodiment" herein does not necessarily refer to the same embodiment.

In the specification provided herein, a large number of specific details are described. However, it can be understood that the embodiments of the present disclosure can be practiced without these specific details. In some embodiments, well-known methods, structures, and techniques are not shown in detail to avoid obscuring the understanding of this specification.

In the claims, any reference sign between brackets should not be constructed as a limitation on the claims. The word "contain" does not exclude the presence of elements or steps not listed in the claims. The word "one" or "a/an" preceding an element does not exclude the existence of a plurality of such elements. The present disclosure can be implemented with the assistance of hardware including several different components and the assistance of a properly programmed computer. In the unit claims where several apparatuses are listed, several of the apparatuses may be embodied by the same hardware item. The use of words such as first, second, and third does not indicate any order. The words may be interpreted as names.

Finally, it should be noted that the foregoing embodiments are used only to explain the technical solutions of the present disclosure but are not intended to limit the present disclosure. Although the present disclosure has been described in detail with reference to the foregoing embodiments, those of ordinary skill in the art should understand that they can still modify the technical solutions described in the foregoing embodiments or make equivalent substitutions on some technical features therein. The modifications or substitutions do not make the essence of the corresponding technical solutions deviate from the spirit and scope of the technical solutions of the embodiments of the present disclosure.

What is claimed is:

1. A plug module, comprising a housing, a bottom plate, a plurality of box core modules with an independent tripping mechanism, a first pin electrode, and a second pin electrode, wherein each of the plurality of box core modules comprises a box core frame, a voltage-limiting element, a spring electrode, and a tripping mechanism, wherein the voltage-limiting element and the spring electrode are respectively arranged on front and back sides of the box core frame, the voltage-limiting element comprises a pin electrode and a tripping electrode, wherein the tripping electrode of the voltage-limiting element and one end of the spring electrode are welded using a fusible alloy, the tripping mechanism acts on the spring electrode, the tripping mechanism always separates the tripping electrode from the spring electrode when the fusible alloy is melted, the pin electrode of the voltage-limiting element is led out from a side surface of the box core frame to form a first module electrode of the box core module, an electrode of the tripping mechanism is led out from a bottom surface of the box core frame to form a second module electrode of the box core module;

the plurality of box core modules are vertically arranged on the bottom plate in a same direction and side-by-side manner, and the plurality of box core modules are connected by a first internal connection electrode to form a parallel combined line; or the plurality of box core modules are vertically arranged on the bottom plate in an opposite direction and side-by-side manner, and every two adjacent box core modules are connected by a second internal connection electrode to form a series combined line;

wherein the parallel combined line or the series combined line is led out through the first pin electrode and the second pin electrode.

2. The plug module according to claim 1, comprising two box core modules, wherein the two box core modules are vertically arranged on the bottom plate in the opposite direction and side-by-side manner, the second internal connection electrode comprises a series electrode arranged on a bottom surface of the bottom plate, second module electrodes of the two box core modules are fixedly and conductively connected at a bottom side through the series electrode, the first pin electrode and the second pin electrode are led out from two sides of the bottom plate respectively, first module electrodes of the two box core modules are fixedly and conductively connected to the first pin electrode and the second pin electrode on two side surfaces of the box core frame respectively, such that the two box core modules form the series combined line.

3. The plug module according to claim 2, wherein the series electrode is a planarly-structured electrode.

4. The plug module according to claim 1, wherein the plurality of box core modules are vertically arranged on the bottom plate in the same direction and side-by-side manner, the first internal connection electrode comprises a parallel electrode, second module electrodes of the plurality of box core modules are fixedly and conductively connected through the parallel electrode, the parallel electrode is connected to the first pin electrode, first module electrodes of the plurality of box core modules are fixedly and conductively connected to the second pin electrode, such that the plurality of box core modules form the parallel combined line.

5. The plug module according to claim 4, wherein the parallel electrode is an electrode with an L-shaped structure, and a vertically arranged end of the electrode with the L-shaped structure is fixedly and conductively connected to the first pin electrode, a horizontally arranged end of the electrode with the L-shaped structure is separated to form two electrodes, and the two electrodes are fixedly and conductively connected to the first module electrodes of the plurality of box core modules respectively.

6. The plug module according to claim 2, wherein the first pin electrode and the second pin electrode are plate-shaped electrodes of a same structure, and each of the first pin electrode and the second pin electrode comprises a welding portion, a clamping portion, and a plugging portion, wherein the plugging portion is led out from the bottom plate and is a lead-out pin of the plug module, the clamping portion is provided with a slot and/or a hole for clamping the box core module and the bottom plate, the welding portion is separated into welding electrodes having a same quantity as the plurality of box core modules, and a spacing between centers of adjacent welding electrodes is a spacing between centers of adjacent box core modules, such that the welding electrodes are fixedly and conductively connected to the first module electrodes of the plurality of box core modules.

7. A surge protective device (SPD), comprising:

a base, and the plug module according to claim 1, wherein the base has a plug slot for accommodating the first pin electrode and the second pin electrode.

8. The plug module according to claim 1, wherein in the box core module, the tripping mechanism comprises the box core frame, a spring, and a slider, wherein when the fusible alloy is melted, the spring pushes the slider to slide within the box core frame to always separate the tripping electrode from the spring electrode.

9. The plug module according to claim 8, wherein in the box core module, an indication device is disposed on the box core module, and a side of the box core frame is provided with a positioning column, wherein the tripping mechanism is disposed on the side of the box core frame; the indication device is disposed on the positioning column, and the indication device rotates by a certain angle around an axis of the positioning column under a sliding effect of the slider.

10. The plug module according to claim 4, wherein the first pin electrode and the second pin electrode are plate-shaped electrodes of a same structure, and each of the first pin electrode and the second pin electrode comprises a welding portion, a clamping portion, and a plugging portion, wherein the plugging portion is led out from the bottom plate and is a lead-out pin of the plug module, the clamping portion is provided with a slot and/or a hole for clamping the box core module and the bottom plate, the welding portion is separated into welding electrodes having a same quantity as the plurality of box core modules, and a spacing between centers of adjacent welding electrodes is a spacing between centers of adjacent box core modules, such that the welding electrodes are fixedly and conductively connected to the first module electrodes of the plurality of box core modules.

11. The SPD according to claim 7, wherein the plug module comprises two box core modules, wherein the two box core modules are vertically arranged on the bottom plate in the opposite direction and side-by-side manner, the second internal connection electrode comprises a series electrode arranged on a bottom surface of the bottom plate, second module electrodes of the two box core modules are fixedly and conductively connected at a bottom side through the series electrode, the first pin electrode and the second pin electrode are led out from two sides of the bottom plate respectively, first module electrodes of the two box core modules are fixedly and conductively connected to the first pin electrode and the second pin electrode on two side surfaces of the box core frame respectively, such that the two box core modules form the series combined line.

12. The SPD according to claim 11, wherein in the plug module, the series electrode is a planarly-structured electrode.

13. The SPD according to claim 7, wherein the plurality of box core modules are vertically arranged on the bottom plate in the same direction and side-by-side manner, the first internal connection electrode comprises a parallel electrode, second module electrodes of the plurality of box core modules are fixedly and conductively connected through the parallel electrode, the parallel electrode is connected to the first pin electrode, first module electrodes of the plurality of box core modules are fixedly and conductively connected to the second pin electrode, such that the plurality of box core modules form the parallel combined line.

14. The SPD according to claim 13, wherein in the plug module, the parallel electrode is an electrode with an L-shaped structure, and a vertically arranged end of the electrode with the L-shaped structure is fixedly and conductively connected to the first pin electrode, a horizontally arranged end of the electrode with the L-shaped structure is separated to form two electrodes, and the two electrodes are fixedly and conductively connected to the first module electrodes of the plurality of box core modules respectively.

15. The SPD according to claim 11, wherein in the plug module, the first pin electrode and the second pin electrode are plate-shaped electrodes of a same structure, and each of the first pin electrode and the second pin electrode comprises a welding portion, a clamping portion, and a plugging portion, wherein the plugging portion is led out from the bottom plate and is a lead-out pin of the plug module, the clamping portion is provided with a slot and/or a hole for clamping the box core module and the bottom plate, the welding portion is separated into welding electrodes having a same quantity as the plurality of box core modules, and a spacing between centers of adjacent welding electrodes is a spacing between centers of adjacent box core modules, such that the welding electrodes are fixedly and conductively connected to the first module electrodes of the plurality of box core modules.

* * * * *